United States Patent [19]

Shigeura et al.

[11] Patent Number: 4,750,680
[45] Date of Patent: Jun. 14, 1988

[54] VERTICALLY CONTROLLED TRACK SANDER

[75] Inventors: Junichi Shigeura; Noriyuki Isoda; Nobuyoshi Takahashi, all of Hyogo, Japan

[73] Assignee: Mitsubishi Denki Kabushiki Kaisha, Tokyo, Japan

[21] Appl. No.: 58,965

[22] Filed: Jun. 8, 1987

[30] Foreign Application Priority Data

Jul. 9, 1986 [JP] Japan .............................. 61-161413

[51] Int. Cl.⁴ ...................... B60B 39/04; B61C 15/10
[52] U.S. Cl. .................................................. 291/47
[58] Field of Search ....................... 291/1, 3, 11 A, 41, 291/46, 47

[56] References Cited

U.S. PATENT DOCUMENTS

| 709,414 | 9/1902 | Lewis | 291/47 |
| 1,403,878 | 1/1922 | Swearingen | 291/47 |
| 1,546,279 | 3/1925 | Adkins et al. | 291/47 |

FOREIGN PATENT DOCUMENTS 596455 1/1948 United Kingdom .

*Primary Examiner*—Johnny D. Cherry
*Assistant Examiner*—Frank Williams
*Attorney, Agent, or Firm*—Sughrue, Mion, Zinn, Macpeak & Seas

[57] ABSTRACT

A device for increasing the factor of adhesion between the wheel of a railway vehicle and a rail, in which adhesion increasing grains are ejected together with air to a point between the wheel and the rail. The vertical aim of the ejection nozzle is automatically controlled depending on the deflection of an elastic member between the undercarriage and the wheel.

1 Claim, 1 Drawing Sheet

VERTICALLY CONTROLLED TRACK SANDER

BACKGROUND OF THE INVENTION (Field of the Invention)

The present invention relates to a device for increasing the factor of adhesion between the wheel of a railway vehicle and a rail.

(Description of the Prior Art)

FIG. 3 shows a conventional railway vehicle adhesion increasing device disclosed in the Japanese Patent Application (OPI) No. 163703/85 (the term "OPI" as used herein means an "unexamined published application"). Shown at 1, 2 and 3 in FIG. 3 are an iron wheel, a rail and an undercarriage which is supported with a spring (not shown in the drawing) to the wheel. A container 4 is supported by the undercarriage 3 and contains a fine powder 7. A pipe 5 is for feeding the fine powder 7 to the contact surfaces of the iron wheel 1 and the rail 2 and is open toward the contact surfaces in front of them with regard to the direction of movement of the railway vehicle. Another pipe 6 is provided along the pipe 5 to apply low air pressure by operating a solenoid valve 8, to eject the fine powder 7 to the contact surfaces of the iron wheel 1 and the rail 2. The diameter of each grain of the fine powder 7 is 10 to 100 μm.

(Problem to be solved by the invention)

Since the conventional railway vehicle adhesion increasing device is constructed as described above, there is a problem that the direction of the ejection of the fine powder become uncoincident with the optimal point between the wheel and the rail when the spring between the undercarriage and an axle is deformed due to the increase or decrease in the load thereon or the like.

The present invention was made in order to solve the problem.

Accordingly, it is an object of the present invention to provide a railway vehicle adhesion increasing device in which the proper direction of ejection of a fine powder is always maintained regardless of the deflection of a spring between an undercarriage and an axle.

SUMMARY OF THE INVENTION

In the railway vehicle adhesion increasing device provided in accordance with the present invention, the quantity of the deflection of the spring between the undercarriage and the axle is detected to generate a signal to control the direction of ejection of the adhesion increasing grains of the fine powder.

Since the direction of ejection of the adhesion increasing grains is controlled depending on the quantity of the deflection of the spring between the undercarriage and the axle, the adhesion increasing grains are always ejected to a proper point between a wheel and rail.

DETAILED DESCRIPTION OF THE PREFERRED EMBODIMENT

An embodiment of the present invention is hereafter described with reference to the drawings attached hereto.

Figure 1:
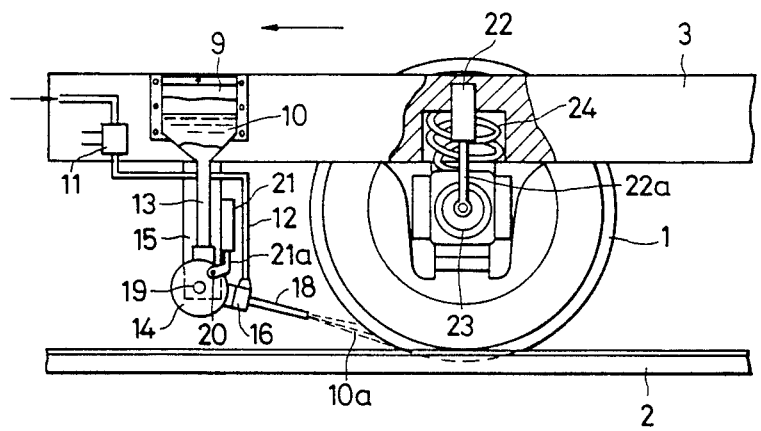
FIG. 1 shows a schematic view of an embodiment of the present invention.
Figure 2:
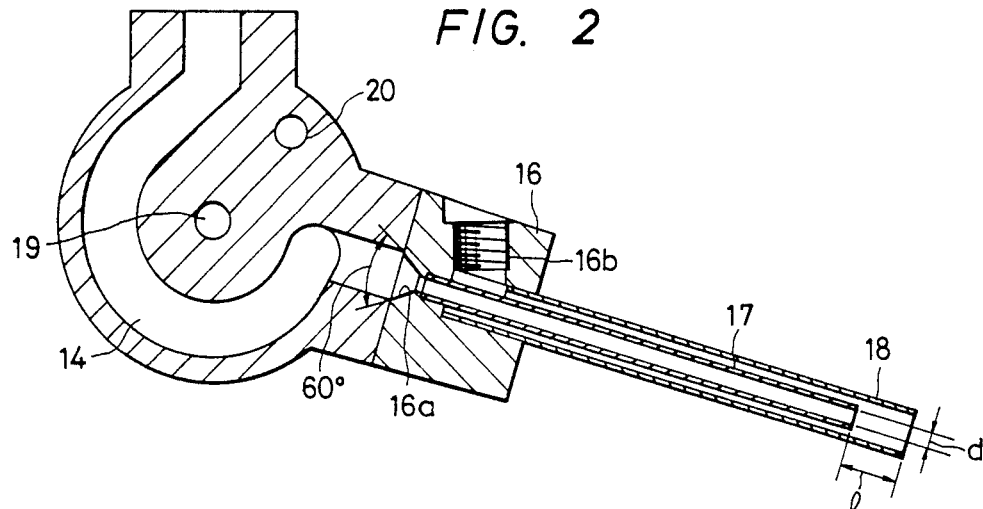
FIG. 2 shows a sectional view of a major part shown in FIG. 1.
Figure 3:
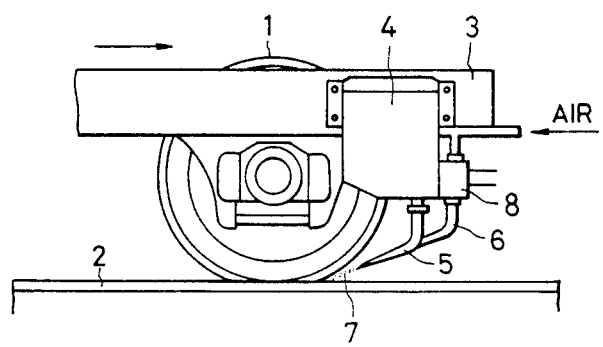
FIG. 3 shows a schematic view of a conventional adhesion increasing device.

FIGS. 1 and 2 show an iron wheel 1, a rail 2 and an undercarriage 3 which are conventional ones. Adhesion increasing grains 10 are stored in a container 9. The grains 10 are sand, quartz, a mixture of them or the like, which is capable of increasing the adhesion between the iron wheel 1 and the rail 2. The diameter of each of the grains 10 is 100 to 500 μm. A solenoid valve 11 is for controlling the feed of compressed air. An air pipe 12 is for feeding the compressed air. A conveyance pipe 13 is for conveying the adhesion increasing grains 10. A U-shaped storage chamber body 14 is attached to a mounting plate 15 by a rotary shaft 19 and connected to the container 9 through the conveyance pipe 13. The mounting plate 15 is secured to the undercarriage 3. A connector 16 is coupled to the storage chamber body 14 and has a first through hole 16a and a second through hole 16b. One end of the first through hole 16a is open at an angle of 60°. The second through hole 16b communicates with the first through hole 16a and is coupled to the air pipe 12. A grain pipe 17 is connected at one end thereof to the storage chamber body 14 through the connector 16. A compressed air pipe 18 is connected to the second through hole 16b of the connector 16, surrounds the grain pipe 17 and projects at the tip thereof by a length of 7.5 to 22.5 mm from the grain pipe. The storage chamber body 14 can be turned or swung about the rotary shaft 19. A swinging shaft 20 is provided over the storage chamber body 14 and located in a position different from that of the rotary shaft 19. A swinging actuator 21 is secured at one end thereof to the swinging shaft 20 through a lever 21a so that the swinging shaft can be turned. The end of the actuator 21, which is attached to the swinging shaft 20, can be protruded away from or retracted toward the other end of the actuator by a signal based on the change in an electric quantity, the magnitude of air pressure or the like. The storage chamber body 14 can be swung about the rotary shaft 19 by protruding or retracting the end of the actuator 21. A displacement meter 22 is secured at one end thereof to the undercarriage 3 and at the other end thereof to an axle 23, a bearing housing or the like through a lever 22a. The compressed air pipe 12 and the adhesion increasing grain conveyance pipe 13 are made of flexible hoses or the like and provided with universal joints or the like so that the pipes can flexibly follow the swinging motion of the storage chamber body 14.

The ejection of the adhesion increasing grains 10 is now described. The solenoid valve 11 is first energized to open to eject compressed air from the compressed air pipe 18 through the air pipe 12. Because of a pressure difference and the viscosity of the compressed air ejected from the tip of the compressed air pipe 18, the adhesion increasing grains 10 in the storage chamber body 14 are ejected through the grain pipe 17 together with the compressed air. Since the compressed air conveyed through the compressed air pipe 18 is ejected from around the grain pipe 17, an air curtain is made so that the adhesion increasing grains 10 are ejected in between the wheel 1 and the rail 2 without scattering. In order to stop ejecting the adhesion increasing grains 10, the feed of the compressed air to the compressed air pipe 18 is ceased.

When the load on a spring 24 for supporting the axle 23 is increased, the spring is deformed so that the undercarriage 3 is displaced down toward the rail 2 because the axle 23 remains undisplaced as long as the diameter of the wheel 1 is constant. As a result, the actuator 21 is compressed in accordance with a displacement signal from the displacement meter 22, so that the whole storage chamber body 14 is turned or swung upward about the rotary shaft 19 through the action of the swinging shaft 20.

When the load on the spring 24 is decreased, the distance between the axle 23 and the undercarriage 3 increases to elongate the actuator 21 by a length corresponding to the quantity of the displacement of the displacement meter 22 to turn or swing the storage chamber body 14 downward.

Consequently, the adhesion increasing grains 10a can be always ejected to a prescribed point between the wheel 1 and the rail 2, from the grain pipe 17, in both the above-described cases of the increase and the decrease in the load on the spring 24.

If the distance between the axle 23 and the undercarriage 3 has decreased as the wheel 3 is worn due to the movement thereof, the length of the lever 21a coupling the swinging shaft 20 and the actuator 21 to each other or that of a lever 23a coupling the displacement meter 22 and the axle 23 to each other is adjusted to correct the direction of the grain pipe 17.

Although the storage chamber body 14 is turned or swung through the use of the displacement meter 22 and the actuator 21 in the above-described embodiment, the present invention is not confined thereto but the change in the distance between the axle 23 and the undercarriage 3 may be transmitted through a lever, a link, a rope or the like to swing the storage chamber body 14 to produce the same effect as the embodiment.

According to the present invention, the posture of an adhesion increasing grain pipe can be controlled to always eject adhesion increasing grains to a proper point even if the distance between an undercarriage and an axle changes.

What is claimed is:

1. An apparatus for injecting sand into a nip between a rail (2) and a wheel (1) of a railway vehicle supported on an undercarriage (3) by spring means (24), comprising:
    (a) a sand container (9) mounted to the undercarriage,
    (b) elongate nozzle means (17,18),
    (c) coupling means (14) connecting an outlet of the container to an inlet of the nozzle means, said coupling means being rigid with the nozzle means and mounted to the undercarriage for rotation about a horizontal axis perpendicular to the rail,
    (d) means (22) for sensing vertical displacements between the undercarriage and the wheel, and
    (e) means (21) responsive to an output from the sensing means for controlling the rotation of the coupling means such that an outlet of the nozzle means is maintained axially oriented towards said nip in a vertical plane.

* * * * *